(12) United States Patent
Osumi et al.

(10) Patent No.: US 7,297,199 B2
(45) Date of Patent: *Nov. 20, 2007

(54) INK JET INK, METHOD FOR PRODUCING INK JET INK, INK JET RECORDING METHOD AND INK CARTRIDGE

(75) Inventors: Koichi Osumi, Tokyo (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/362,143

(22) Filed: Feb. 27, 2006

(65) Prior Publication Data

US 2006/0139429 A1  Jun. 29, 2006

Related U.S. Application Data

(63) Continuation of application No. PCT/JP2005/016188, filed on Aug. 30, 2005.

(30) Foreign Application Priority Data

Aug. 31, 2004 (JP) ............................. 2004-252203
Aug. 29, 2005 (JP) ............................. 2005-247601

(51) Int. Cl.
*C09D 11/02* (2006.01)
*B41J 2/01* (2006.01)

(52) U.S. Cl. ..................... 106/31.5; 347/100
(58) Field of Classification Search ............... 106/31.5, 106/31.79, 31.78; 534/691; 347/100
See application file for complete search history.

(56) References Cited

U.S. PATENT DOCUMENTS 2,232,078 A * 2/1941 Schindhelm ............... 534/691

3,310,551 A * 3/1967 McLeod ..................... 534/691

(Continued)

FOREIGN PATENT DOCUMENTS

EP          1669413        * 6/2006

(Continued)

*Primary Examiner*—Helene Klemanski
(74) *Attorney, Agent, or Firm*—Fitzpatrick, Cella, Harper & Scinto

(57) ABSTRACT

An ink jet ink includes at least a coloring material. The coloring material is composed of at least one selected from the group consisting of C.I. Direct Yellow 86, C.I. Acid Yellow 23, C.I. Direct Yellow 173, C.I. Direct Yellow 132 and C.I. Direct Yellow 59, and a compound represented by the following the general formula (I) or a salt thereof.

General formula (I)

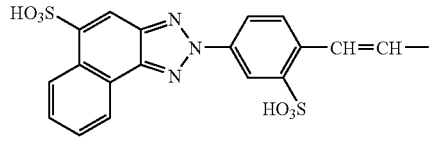

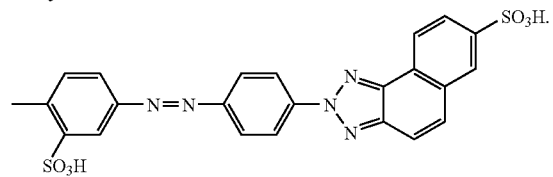

5 Claims, 2 Drawing Sheets

U.S. PATENT DOCUMENTS

| | | | | |
|---|---|---|---|---|
| 3,575,954 | A * | 4/1971 | Jirou et al. | 534/691 |
| 3,578,653 | A * | 5/1971 | Wallace | 534/691 |
| 5,268,459 | A | 12/1993 | Gregory et al. | 534/758 |
| 5,976,233 | A | 11/1999 | Osumi et al. | 106/31.86 |
| 6,221,141 | B1 | 4/2001 | Takada et al. | 106/31.6 |
| 6,280,513 | B1 | 8/2001 | Osumi et al. | 106/31.6 |
| 6,332,919 | B2 | 12/2001 | Osumi et al. | 106/31.6 |
| 6,342,095 | B1 | 1/2002 | Takizawa et al. | 106/31.27 |
| 6,375,317 | B1 | 4/2002 | Osumi et al. | 347/100 |
| 6,387,168 | B1 | 5/2002 | Koitabashi et al. | 106/31.6 |
| 6,425,662 | B1 | 7/2002 | Teraoka et al. | 347/100 |
| 6,474,804 | B2 | 11/2002 | Osumi et al. | 347/100 |
| 6,506,239 | B1 | 1/2003 | Osumi et al. | 106/31.27 |
| 6,511,534 | B1 | 1/2003 | Mishina et al. | 106/31.33 |
| 6,521,034 | B1 | 2/2003 | Osumi et al. | 106/31.6 |
| 6,533,853 | B1 | 3/2003 | Mishina et al. | 106/31.6 |
| 6,540,329 | B1 | 4/2003 | Kaneko et al. | 347/43 |
| 6,547,381 | B2 | 4/2003 | Watanabe et al. | 347/100 |
| 6,572,692 | B1 | 6/2003 | Osumi et al. | 106/31.6 |
| 7,056,374 | B2 * | 6/2006 | Kitayama et al. | 106/31.46 |
| 7,128,779 | B2 | 10/2006 | Osumi et al. | 106/31.52 |
| 7,144,449 | B2 | 12/2006 | Udagawa et al. | 106/31.15 |
| 7,195,665 | B2 | 3/2007 | Osumi et al. | 106/31.47 |
| 2004/0099180 | A1 | 5/2004 | Kitayama et al. | 106/31.46 |
| 2005/0005818 | A1 | 1/2005 | Sato et al. | 106/31.27 |
| 2005/0088501 | A1 | 4/2005 | Nagashima et al. | 347/100 |
| 2006/0007288 | A1 | 1/2006 | Takada et al. | 347/100 |
| 2006/0011097 | A1 | 1/2006 | Tsuji et al. | 106/31.48 |
| 2006/0012657 | A1 | 1/2006 | Nagashima et al. | 347/100 |
| 2006/0065157 | A1 | 3/2006 | Kawabe et al. | 106/31.48 |
| 2006/0096498 | A1 | 5/2006 | Tsujimura et al. | 106/31.27 |
| 2006/0098067 | A1 | 5/2006 | Imai et al. | 347/100 |
| 2006/0098068 | A1 | 5/2006 | Hakamada et al. | 347/100 |
| 2006/0100311 | A1 | 5/2006 | Tokuda et al. | 523/160 |
| 2006/0103703 | A1 | 5/2006 | Nito et al. | 347/100 |
| 2006/0103704 | A1 | 5/2006 | Hakamada et al. | 347/100 |
| 2006/0119685 | A1 * | 6/2006 | Yamashita et al. | 347/100 |
| 2006/0125896 | A1 | 6/2006 | Aikawa et al. | 347/100 |
| 2006/0137570 | A1 | 6/2006 | Osumi et al. | 106/31.27 |
| 2006/0142417 | A1 | 6/2006 | Kaneko et al. | 523/160 |
| 2006/0152570 | A1 | 7/2006 | Ishikawa et al. | 347/105 |
| 2006/0192827 | A1 | 8/2006 | Takada et al. | 347/100 |
| 2006/0194056 | A1 | 8/2006 | Nagashima et al. | 428/403 |
| 2006/0194897 | A1 | 8/2006 | Kawabe et al. | 523/160 |
| 2007/0029522 | A1 | 2/2007 | Udagawa et al. | 252/301.16 |

FOREIGN PATENT DOCUMENTS

| | | |
|---|---|---|
| GB | 1251319 * | 10/1971 |
| JP | 2-233781 | 9/1990 |
| JP | 4-233975 | 8/1992 |
| JP | 2003-183545 | 7/2003 |
| JP | 2003-321627 | 11/2003 |
| WO | WO 2005/033211 | 4/2005 |

* cited by examiner

INK JET INK, METHOD FOR PRODUCING INK JET INK, INK JET RECORDING METHOD AND INK CARTRIDGE

This application is a continuation of International Application No. PCT/JP2005/016188, filed Aug. 30, 2005, which claims the benefit of Japanese Patent Application Nos. 2004-252203, filed Aug. 31, 2004, and 2005-247601, filed Aug. 29, 2005.

BACKGROUND OF THE INVENTION

1. Field of the Invention

The present invention relates to an ink jet ink, a method for producing an ink jet ink, an ink jet recording method and an ink cartridge.

2. Related Background Art

An ink jet recording method is a recording method of applying a small ink droplet to any one of recording media such as plain paper, glossy media and the like to form an image, and has become rapidly widespread owing to reduction in its costs and improvement in its recording rate. In addition to the improved quality of the recorded image, and concurrently with the rapid spread of digital cameras, users of ink jet printers now demand to output recorded matter which are comparable to a silver halide photograph.

As a necessary requirement for a recorded matter which is obtained from an ink jet recording method and is comparable to a silver halide photograph, it is cited that both high color developability and durability of the obtained recorded matter are realized simultaneously. In particular, if a recorded matter obtained using yellow ink is left for a long period of time in a high-humidity environment, in some cases the image is susceptible to varying in color tone and fading due to migration of the coloring material in the image. That is, there is the problem that, in some cases, the durability (especially humidity resistance) of a recorded matter obtained using yellow ink is worse than that of a recorded matter obtained using cyan ink or magenta ink. In the past various technological improvements have been carried out to resolve this problem.

For example, to improve humidity resistance of a recorded matter, inks which include a coloring material having a specific structure such as C.I. Direct Yellow 173 or C.I. Direct Yellow 86 have been proposed (e.g. see Japanese Patent Application Laid-Open H02-233781 and Japanese Patent Application Laid-Open H04-233975). Inks which include a novel coloring material having humidity resistance, light resistance, moisture resistance, a hue and vividness suitable for an ink jet recording method have also been proposed (e.g. see Japanese Patent Application Laid-Open 2003-321627).

SUMMARY OF THE INVENTION

As described above, there is a need for an ink jet ink which can provide images that have both high color developability and humidity resistance. However, regarding the color developability and humidity resistance of a recorded matter obtained from an ink jet recording method, there are users who are satisfied with the level of color developability and humidity resistance that can be obtained from a conventional ink jet ink.

In view of this, although there are at present a variety of recording media for an ink jet recording method, it was discovered from investigations carried out by the present inventors that depending on the types of recording media and storage environment, a conventional ink jet ink may result in unsatisfactory color developability and humidity resistance even for such users.

Therefore, it turned out that it is necessary to improve the color developability and humidity resistance even in some degree over those of conventional ink jet inks.

Accordingly, an object of the present invention is to provide an ink jet ink which provides an image having excellent color developability and humidity resistance.

Another object of the present invention is to provide a method for producing an ink jet ink which provides images having excellent color developability and humidity resistance.

Still another object of the present invention is to provide an ink jet recording method and an ink cartridge which use the above-described ink jet ink.

The above objects are achieved by the following present invention. That is, the ink jet ink of the present invention comprises at least a coloring material, wherein the coloring material comprises at least one selected from the group consisting of C.I. Direct Yellow 86, C.I. Acid Yellow 23, C.I. Direct Yellow 173, C.I. Direct Yellow 132 and C.I. Direct Yellow 59, and a compound represented by the following general formula (I) or a salt thereof.

General formula (I)

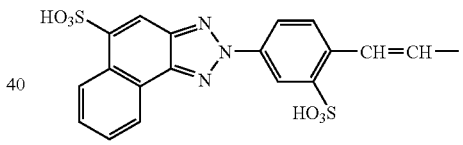

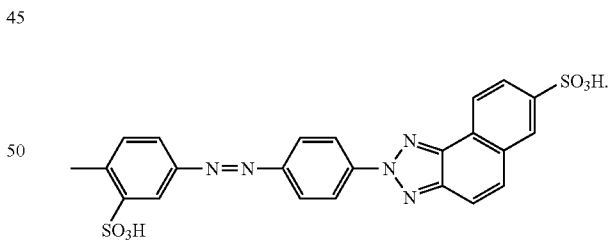

The method for producing an ink jet ink according to another embodiment of the present invention comprises a step of filling an ink jet ink tank which stores an ink jet ink comprising, as a coloring material, a compound represented by the following general formula (I) or salt thereof, with an ink jet ink comprising, as a coloring material, at least one selected from the group consisting of C.I. Direct Yellow 86, C.I. Acid Yellow 23, C.I. Direct Yellow 173, C.I. Direct Yellow 132 and C.I. Direct Yellow 59.

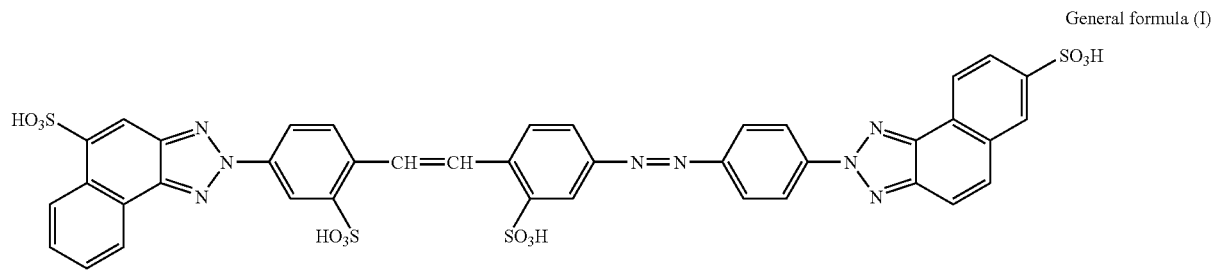

General formula (I)

The ink jet ink according to another embodiment of the present invention is obtained by the method for producing an ink jet ink according to the above-described constitution.

The ink jet recording method according to another embodiment of the present invention comprises a step of ejecting an ink by ink jet method to conduct recording on a recording medium, wherein the ink is an ink jet ink according to the above-described constitution.

The ink cartridge according to another embodiment of the present invention comprises an ink storage portion for storing an ink, wherein the ink comprises an ink jet ink according to the above-described constitution.

According to the present invention, an ink jet ink can be provided which provides an image having excellent color developability and humidity resistance. Further, according to another embodiment of the present invention, a method for producing an ink jet ink can be provided which provides an image having excellent color developability and humidity resistance. Further, according to another embodiment of the present invention, an ink jet recording method and an ink cartridge can be provided which use the above-described ink jet ink.

DESCRIPTION OF THE PREFERRED EMBODIMENTS

Figure 1:
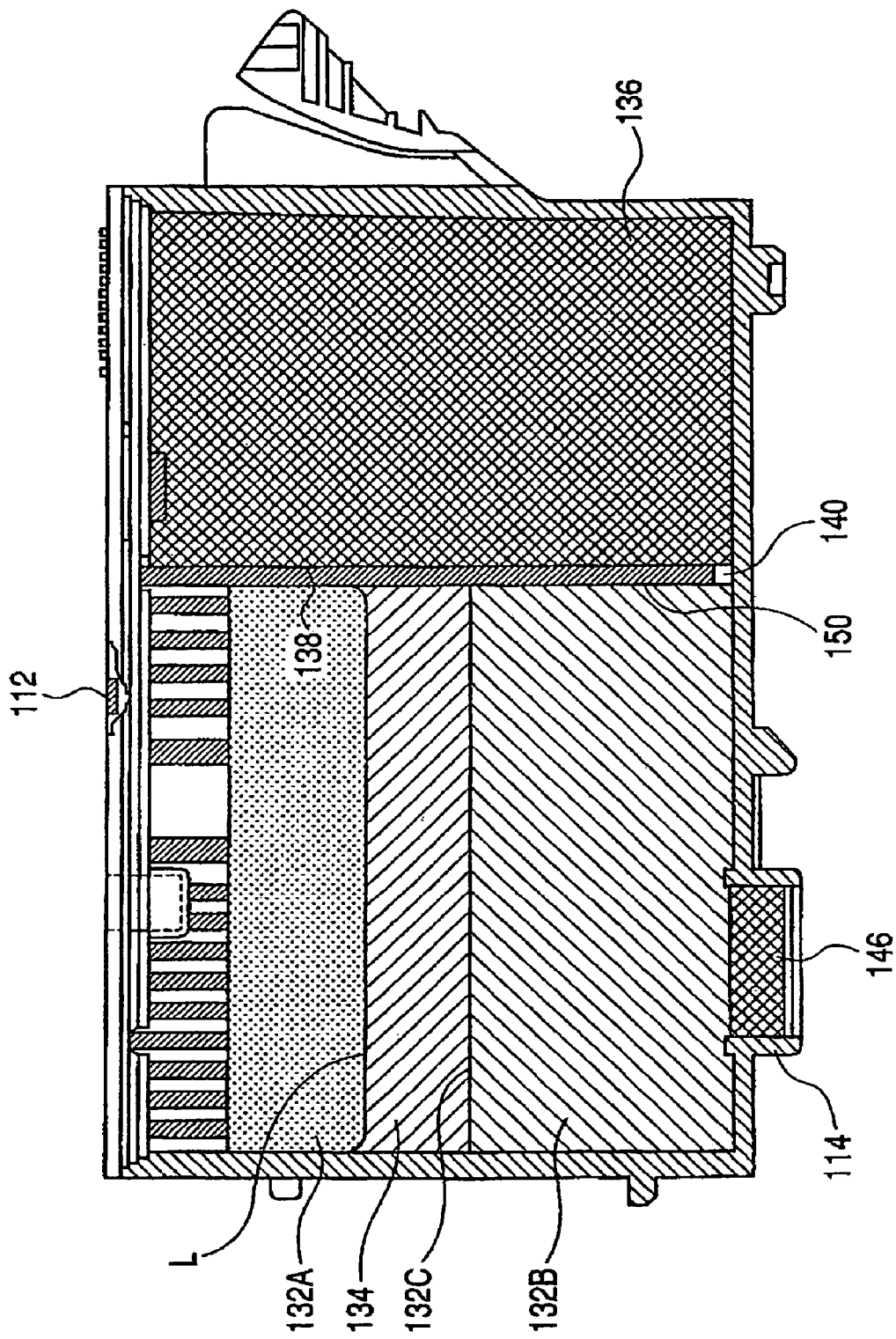
FIG. 1 is a schematic explanatory diagram of a liquid-storing container (ink tank)

Hereinafter, the present invention will be described in more detail by way of preferred embodiments.

In the present invention, when a coloring material is a salt, the salt is dissociated into ions in ink, but this state is represented by using the phrase "contains a salt" for convenience.

<Ink>

The components and other substances which constitute the ink jet ink according to the present invention (hereinafter also referred to simply as "ink") will be described below in detail.

(Coloring Material)

It is essential that the ink according to the present invention comprise as a coloring material at least one selected from the group consisting of C.I. Direct Yellow 86, C.I. Acid Yellow 23, C.I. Direct Yellow 173, C.I. Direct Yellow 132 and C.I. Direct Yellow 59. These coloring materials have excellent color developability, whereby images comparable in color developability of a silver-halide photograph can be formed by using an ink containing such a coloring material.

In addition to the above-described coloring materials, it is essential that the ink according to the present invention comprise a compound represented by the following general formula (I) or a salt thereof. Since the compound represented by the following the general formula (I) or salts thereof have extremely high humidity resistance as well as good color developability, the humidity resistance of the coloring material which is at least one selected from the group consisting C.I. Direct Yellow 86, C.I. Acid Yellow 23, C.I. Direct Yellow 173, C.I. Direct Yellow 132 and C.I. Direct Yellow 59, can be improved even if they are contained in a minute amount in the ink. Further, a compound represented by the following general formula (I) or a salt thereof does not impair the excellent inherent color developability of the coloring material, which is at least one selected from the group consisting of C.I. Direct Yellow 86, C.I. Acid Yellow 23, C.I. Direct Yellow 173, C.I. Direct Yellow 132 and C.I. Direct Yellow 59.

Specific examples of a counter ion in the salt of the compound represented by the general formula (I) include, for example, an alkali metal ion of lithium, sodium, potassium or the like, or an ammonium ion.

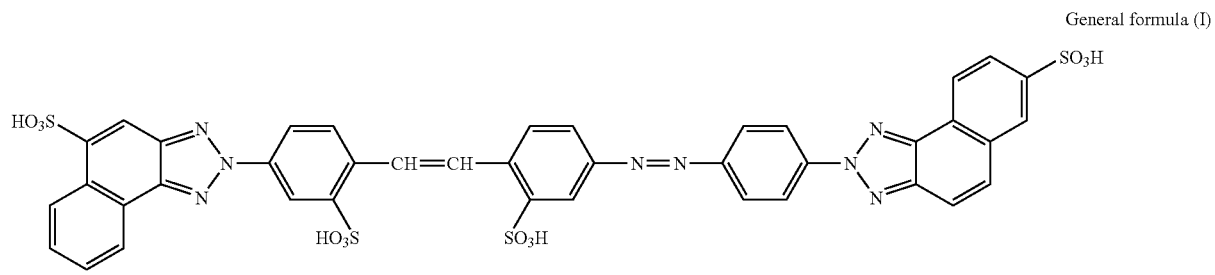

General formula (I)

The total content (mass %) of the coloring material in the ink according to the present invention is preferably from 0.1 mass % or more to 10.0 mass % or less with respect to the total mass of the ink. If the total content of the coloring material is less than 0.1 mass %, the humidity resistance and image density may not be sufficiently attained. If the total content of the coloring material exceeds 10.0 mass %, reliability as an ink jet ink, for instance the sticking properties or similar properties, may be lowered. The content (mass %) of the compound represented by the general formula (I) or a salt thereof is preferably from 0.05 mass % or more to 2.0 mass % or less with respect to the total mass of the ink. If the content of the compound represented by the general formula (I) or a salt thereof is less than 0.05 mass %, or if the content exceeds 2.0 mass %, the color developability and the humidity resistance may not be attained. Further, the ratio of the content (mass %) of the compound represented by the general formula (I) or a salt thereof (mass %) to the total content of the coloring material is preferably from 1.6 mass % or more to 20.0 mass % or less. If the ratio is less than 1.6 mass %, or if the ratio exceeds 20.0 mass %, the color developability and the humidity resistance may not be sufficiently attained.

It is noted that neither the upper limit of the content of the compound represented by the general formula (I) or a salt thereof, nor the upper limit of the content ratio of the compound represented by the general formula (I) or a salt thereof is particularly restricted. As long as the ink according to present invention comprises at least one selected from the group consisting of C.I. Direct Yellow 86, C.I. Acid Yellow 23, C.I. Direct Yellow 173, C.I. Direct Yellow 132 and C.I. Direct Yellow 59, it is preferable to incorporate therein more of the content and ratio of the compound represented by the general formula (I) or a salt thereof, in order to enhance the humidity resistance of the coloring materials.

(Method of Testing Coloring Material)

The compound represented by the general formula (I) or a salt thereof to be used in the present invention as a coloring material can be tested by following methods (1) to (3) each of which involves the use of high performance liquid chromatography (HPLC).

(1) Retention time of a peak
(2) Maximum absorption wavelength in the peak of (1)
(3) M/Z (posi, nega) of mass spectrum in the peak of (1)

Analysis conditions for high performance liquid chromatography are as shown below.

An ink solution diluted 1000 times with pure water is analyzed by means of high performance liquid chromatography under the following conditions to measure the retention time of a peak and the maximum absorption wavelength of the peak.

Column: Symmetry C18 2.1 mm×150 mm
Column temperature: 40° C.
Flow rate: 0.2 ml/min
PDA: 210 nm to 700 nm
Mobile phase and gradient condition: Table 1

TABLE 1

|  | 0-5 min | 5-40 min | 40-45 min |
| --- | --- | --- | --- |
| A Water | 85% | 85%→0% | 0% |
| B Methanol | 10% | 10%→95% | 95% |
| C 0.2 mol/l ammonium acetate aqueous solution | 5% | 5% | 5% |

In addition, analysis conditions for mass spectrum are as shown below.

The mass spectrum of the resultant peak is measured under the following conditions, and the most strongly detected M/Z is measured for each of posi and nega.

Ionization method

| ESI | Capillary voltage | 3.5 kV |
| --- | --- | --- |
|  | Desolvating gas | 300° C. |
|  | Ion source temperature | 120° C. |
| Detector | posi | 40 V 500-2,000 amu/0.9 sec |
|  | nega | 40 V 500-2,000 amu/0.9 sec |

Table 2 shows the values of the retention time, maximum absorption wavelength, M/Z(posi) and M/Z(nega) of the compound represented by the general formula (I) or a salt thereof. When a compound has a value shown in Table 2, the compound can be determined to be a compound used in the present invention.

TABLE 2

| Retention Time [min] | Maximum absorption wavelength [nm] | M/Z | |
| --- | --- | --- | --- |
|  |  | Posi | Nega |
| 31-32 | 390-410 | 938-939 | 468-469 |

(Other Coloring Materials)

In the present invention, other coloring materials may also be used in combination with at least one selected from the group consisting of C.I. Direct Yellow 86, C.I. Acid Yellow 23, C.I. Direct Yellow 173, C.I. Direct Yellow 132 and C.I. Direct Yellow 59, and the compound represented by the general formula (I) or a salt thereof.

In addition, an ink having a color tone different from that of the ink according to the present invention may also be used in combination therewith in order to form full color images. Such an ink may be, for example, cyan ink, magenta ink, yellow ink, black ink and the like. Light-color inks having the same color tone as these inks may also be used in combination. Known coloring materials or newly synthesized coloring materials may be employed as a coloring material for an ink or light-color ink having such a different color tone.

Specific examples of coloring materials for color toning and coloring materials used in the other inks employed together with the ink according to the present invention will be shown according to their color tone. The present invention is, of course, not limited to these examples.

[Magenta Coloring Materials]

C.I. Direct Red 2, 4, 9, 11, 20, 23, 24, 31, 39, 46, 62, 75, 79, 80, 83, 89, 95, 197, 201, 218, 220, 224, 225, 226, 227, 228, 229, 230 and the like; C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265, 289 and the like; C.I. Food Red 87, 92, 94 and the like; C.I. Direct Violet 107 and the like; C.I. Pigment Red 2, 5, 7, 12, 48:2, 48:4, 57:1, 112, 122, 123, 168, 184, 202 and the like.

[Cyan Coloring Materials]

C.I. Direct Blue 1, 15, 22, 25, 41, 76, 80, 90, 98, 106, 108, 120, 158, 163, 168, 199, 226 and the like; C.I. Acid Blue 1, 7, 15, 22, 23, 25, 29, 40, 43, 59, 62, 74, 78, 80, 90, 100, 102, 104, 117, 127, 138, 158, 161, 203, 204, 244 and the like; C.I. Pigment Blue 1, 2, 3, 15, 15:2, 15:3, 15:4, 16, 22, 60 and the like.

[Yellow Coloring Materials]

C.I. Direct Yellow 8, 11, 12, 27, 28, 33, 39, 44, 50, 58, 85, 86, 87, 88, 89, 98, 100, 110, 132, 173 and the like; C.I. Acid Yellow 1, 3, 7, 11, 17, 23, 25, 29, 36, 38, 40, 42, 44, 76, 98, 99 and the like; C.I. Pigment Yellow 1, 2, 3, 12, 13, 14, 15, 16, 17, 73, 74, 75, 83, 93, 95, 97, 98, 114, 128, 138, 180 and the like.

[Orange Coloring Materials]

C.I. Acid Orange 7, 8, 10, 12, 24, 33, 56, 67, 74, 88, 94, 116, 142 and the like; C.I. Acid Red 111, 114, 266, 374 and the like; C.I. Direct Orange 26, 29, 34, 39, 57, 102, 118 and the like; C.I. Food Orange 3 and the like; C.I. Reactive Orange 1, 4, 5, 7, 12, 13, 14, 15, 16, 20, 29, 30, 84, 107 and the like; C.I. Disperse Orange 1, 3, 11, 13, 20, 25, 29, 30, 31, 32, 47, 55, 56 and the like; C.I. Pigment Orange 43 and the like; C.I. Pigment Red 122, 170, 177, 194, 209, 224 and the like.

[Green Coloring Materials]

C.I. Acid Green 1, 3, 5, 6, 9, 12, 15, 16, 19, 21, 25, 28, 81, 84 and the like; C.I Direct Green 26, 59, 67 and the like; C.I. Food Green 3 and the like; C.I. Reactive Green 5, 6, 12, 19, 21 and the like; C.I. Disperse Green 6, 9 and the like; C.I. Pigment Green 7, 36 and the like.

[Blue Coloring Materials]

C.I. Acid Blue 62, 80, 83, 90, 104, 112, 113, 142, 203, 204, 221, 244 and the like; C.I. Reactive Blue 49 and the like; C.I. Acid Violet 17, 19, 48, 49, 54, 129 and the like; C.I. Direct Violet 9, 35, 47, 51, 66, 93, 95, 99 and the like; C.I. Reactive Violet 1, 2, 4, 5, 6, 8, 9, 22, 34, 36 and the like; C.I. Disperse Violet 1, 4, 8, 23, 26, 28, 31, 33, 35, 38, 48, 56 and the like; C.I. Pigment Blue 15:6 and the like; C.I. Pigment Violet 19, 23, 37 and the like.

[Black Coloring Materials]

C.I. Direct Black 17, 19, 22, 31, 32, 51, 62, 71, 74, 112, 113, 154, 168, 195 and the like; C.I. Acid Black 2, 48, 51, 52, 110, 115, 156 and the like; C.I. Food Black 1, 2 and the like; carbon black and the like.

(Aqueous Medium)

The ink according to the present invention can use water or an aqueous medium which is a mixed solvent of water and various water-soluble organic solvents.

The water-soluble organic solvent is not restricted as long as the solvent is soluble in water. Examples of solvents which can be used include alkyl alcohols having 1 to 4 carbon atoms, such as ethanol, isopropanol, n-butanol, isobutanol, sec-butanol and tert-butanol; carboxylic acid amides such as N,N-dimethylformamide or N,N-dimethylacetamide; ketones and ketoalcohols such as acetone, methyl ethyl ketone and 2-methyl-2-hydroxypentan-4-one; cyclic ethers such as tetrahydrofuran and dioxane; polyalcohols such as glycerin, ethylene glycol, diethylene glycol, triethylene glycol, tetraethylene glycol, 1,2- or 1,3-propylene glycol, 1,2- or 1,4-butylene glycol, polyethylene glycol, 1,3-butanediol, 1,5-pentanediol, 1,2-hexanediol, 1,6-hexanediol, dithioglycol, 2-methyl-1,3-propanediol, 1,2,6-hexanetriol, acetylene glycol derivatives and trimethylolpropane; polyalcohol alkyl ethers such as ethylene glycol monomethyl (or ethyl) ether, diethylene glycol monomethyl (or ethyl) ether, and triethylene glycol monomethyl (or butyl) ether; heterocycles such as 2-pyrrolidone, N-methyl-2-pyrrolidone, 1,3-dimethyl-2-imidazolidinone, and N-methylmorpholine; sulfur-containing compounds such as dimethylsulfoxide; and urea and urea derivatives. Each of those water-soluble organic solvents may be used alone, or two or more of them may be used as a mixture.

The content of such water-soluble organic solvent is preferably from 5.0 mass % to 90.0 mass %, more preferably from 10.0 mass % to 50.0 mass % with respect to the total mass of the ink. If the content is less than this range, there is a possibility that reliability, such as ejection properties, is lowered when used for an ink jet ink. If the content exceeds this range, there is a possibility that a problem may occur in ink supply due an increase in ink viscosity.

Deionized water (ion-exchanged water) is preferably used as water. The content of water is preferably from 10.0 mass % to 90.0 mass % with respect to the total mass of the ink.

(Other Additives)

In the present invention, various other additives, such as a surfactant, pH adjuster, chelating agent, corrosion inhibitor, preservative, mildew-proof agent, ultraviolet absorber, viscosity adjuster, defoaming agent and water-soluble polymer, may also be incorporated as needed.

Specific examples of a surfactant include anionic surfactants, ampholytic surfactants, cationic surfactants and nonionic surfactants.

Specific examples of anionic surfactants include alkylsulfocarboxylate, α-olefin sulfonate, polyoxyethylene alkyl ether acetate, N-acylamino acid and salts thereof, N-acylmethyltaurine salts, alkyl sulfate polyoxyalkyl ether sulfate, alkyl sulfate polyoxyethylene alkyl ether phosphate, rosin acid soap, castor oil sulfate, lauryl alcohol sulfate, alkylphenol phosphate, alkyl phosphate, alkylaryl sulfonate, diethyl sulfosuccinate, diethylhexyl sulfosuccinate and dioctyl sulfosuccinate.

Specific examples of cationic surfactants include 2-vinylpyridine derivatives and poly-4-vinylpyridine derivatives.

Specific examples of amphoteric surfactants include lauryl dimethylaminoacetic acid betaines, 2-alkyl-N-carboxymethyl-N-hydroxyethylimidazolinium betaines, palm oil fatty acid amidopropyldimethylaminoacetic acid betaines, polyoctylpolyaminoethyl glycine and other imidazoline derivatives.

Specific examples of nonionic surfactants include ethers such as polyoxyethylene nonylphenyl ether, polyoxyethylene octylphenyl ether, polyoxyethylene dodecylphenyl ether, polyoxyethylene lauryl ether, polyoxyethylene oleyl ether, polyoxyethylene alkyl ethers and polyoxyarylkyl alkyl ethers; esters such as polyoxyethylene oleic acid, polyoxyethylene oleic acid esters, polyoxyethylene distearic acid ester, sorbitan laurate, sorbitan monostearate, sorbitan monooleate, sorbitan sesquioleate, polyoxyethylene monooleate and polyoxyethylene stearate; and acetylene glycols (e.g. Acetylenol EH and E100 manufactured by Kawaken Fine Chemicals Co., Ltd., and Surfynol 104, 82 and 465 and olfin STG manufactured by Nisshin Chemical Co., Ltd.) such as 2,4,7,9-tetramethyl-5-decyne-4,7-diol, 3,6-dimethyl-4-octyne-3,6-diol and 3,5-dimethyl-1-hexyn-3-ol.

Any substance may be used as the pH adjuster as long as it can adjust the pH of the ink to a certain range. Examples of such substance include alcohol amine compounds such as diethanol amine, triethanol amine, isopropanol amine and trihydroxymethylamino methane; alkali metal hydroxides such as lithium hydroxide and potassium hydroxide; ammonium hydroxide; or alkali metal carbonates such as lithium carbonate, sodium carbonate and potassium carbonate.

Specific examples of the preservative and the mildew-proof agent include, for example, organosulfur, organic nitrogen sulfur, organohalogen, haloallylsulfone, iodopropargyl, N-haloalkylthio, benzothiazole, nitrile, pyridine, 8-oxyquinoline, benzothiazole, isothiazolin, dithiol, pyridine oxide, nitropropane, organotin, phenol, quaternary ammonium salt, triazine, thiadiazine, anilide, adamantane, dithiocarbamate, brominated indanone, benzylbromoacetate, and inorganic salt compounds.

Examples of an organohalogen compound include, for example, sodium pentachlorophenol, and examples of a pyridine compound include, for example, sodium 2-pyridinethiol-1-oxide. Examples of an inorganic salt compound include, for example, acetic anhydride soda, and examples of an isothiazolin compound include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride and 5-chloro-2-methyl-4-isothiazolin-3-one calcium chloride. Other specific examples of the preservative and the mildew-proof agent include sorbic acid soda and sodium benzoate, for example, Proxel GXL (S), Proxel XL-2 and the like manufactured by Avecia Limited.

Examples of a chelating agent include, for example, sodium citrate, sodium ethylenediaminetetraacetate, sodium sec-nitrotriacetate, sodium hydroxyethylethylenediaminetriacetate, sodium diethylenetriaminepentaacetate and sodium uramildiacetate.

Examples of the corrosion inhibitor include, for example, acidic sulfite, sodium thiosulfate, ammonium thioglycolate, diisopropyl ammonium nitrite, pentaerythritol tetranitrate and dicyclohexyl ammonium nitrite.

Examples of an ultraviolet absorber compound include, for example, compounds which absorb ultraviolet light and emit fluorescence as represented by benzophenone compounds, benzotriazole compounds, cinnamic acid compounds, triazine compounds, stilbene compounds or benzoxazole compounds. What is called a fluorescent brightening agent may also be used.

In addition to the water-soluble organic solvents, examples of a viscosity modifier include water-soluble polymeric compounds such as polyvinylalcohol, cellulose derivatives, polyamines and polyimines.

A fluorine or silicone compound can be employed as the defoaming agent as necessary.

<Ink Jet Recording Method>

The ink according to the present invention is particularly suitably used for an ink jet recording method comprising a step of ejecting ink by ink jet method. Examples of the ink jet recording method include a recording method which ejects ink by applying mechanical energy to the ink, and a recording method which ejects ink by applying thermal energy to the ink. In particular, in the present invention, an ink jet recording method in which thermal energy is utilized can be preferably used.

<Ink Cartridge>

An example of an ink cartridge suitable for conducting recording by using the ink according to the present invention includes an ink cartridge which is provided with an ink storage portion for storing the ink. Specific examples of such an ink cartridge will be described below.

FIG. 1 is a schematic explanatory view of a liquid-storing container serving as an ink cartridge. In FIG. 1, the liquid-storing container (ink tank) has a structure such that it is in communication with the atmosphere at an upper section via an air communication opening 112, is in communication with an ink supply port at a lower section, and is partitioned by a partitioning wall 138 into a negative-pressure generation member holding chamber 134, which holds a negative-pressure generation member, and a liquid-storing chamber 136, which is essentially sealed, that stores the liquid ink. The negative-pressure generation member holding chamber 134 and the liquid-storing chamber 136 are in communication with each other only through a communication hole 140 formed in the partitioning wall 138 near a bottom section of the liquid-storing container (ink tank), and an air lead-in groove (air lead-in path) 150, whose purpose is to promote the introduction of air into the liquid-storing chamber during liquid supply operation. A plurality of ribs are formed in an integrated manner on an upper wall of the liquid-storing container (ink tank) which forms the negative-pressure generation member holding chamber 134 so as to project into the inside, wherein the ribs are brought into contact with the negative-pressure generation member, which is held in a compressed state, in the negative-pressure generation member holding chamber 134. These ribs form an air buffer chamber between the upper wall and an upper surface of the negative-pressure generation member. A pressure contact member 146 which has greater capillary force than the negative-pressure generation member and possesses great physical strength, is provided on an ink supply pipe provided with a liquid-supply port 114, whereby the ink supply pipe is brought into pressure contact with the negative-pressure generation member.

Two capillary force generation type negative-pressure generation members, composed of a first negative-pressure generation member 132B and a second negative-pressure generation member 132A made from an olefin resin fiber such as polyethylene, are held as the negative-pressure generation member in the negative-pressure generation member holding chamber 134. The member 132C is a boundary layer between these two negative-pressure generation members, wherein the intersection of the boundary layer 132C with the partitioning wall 138 exists above the upper edge of the air lead-in groove (air lead-in path) 150 in the configuration in which the liquid-storing container is being used with its communication part positioned downward. The ink held in the negative-pressure generation members is present at a level higher than the above-described boundary layer 132C, as indicated by the liquid surface L of the ink.

Here, the first negative-pressure generation member 132B is brought into pressure contact with the boundary layer of the second negative-pressure generation member 132A, so that the compression ratio in the vicinity of the boundary layer of the negative-pressure generation members is higher than that in the other sections, whereby strong capillary force is generated. That is, if the capillary force of the first negative-pressure generation member 132B is represented by P1, the capillary force of the second negative-pressure generation member 132A by P2 and the capillary force possessed by the interface between the negative-pressure generation members by PS, the relationship P2<P1<PS is satisfied.

Figure 2:
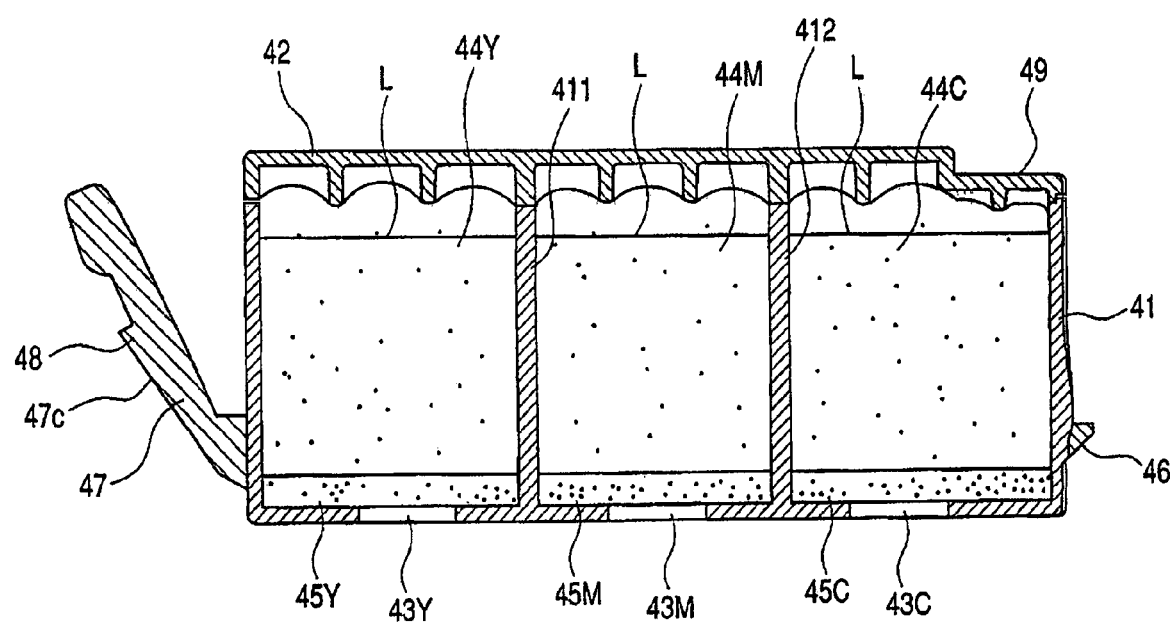
FIG. 2 is a schematic explanatory diagram of another liquid-storing container (ink tank).

FIG. 2 is a schematic explanatory view of a liquid-storing container which is another ink cartridge. The liquid-storing container (ink tank) illustrated in FIG. 2 has a container 41 for storing three colors of inks (yellow (Y), magenta (M) and cyan (C)), and a cap member 42 which covers the container 41. The interior of the container 41 is partitioned into three spaces which have an approximately equal capacity by two partitioning plates 411 and 412 disposed parallel to each other for storing the three ink colors. These three spaces are aligned in the direction in which the ink tank is inserted when mounting the ink tanks onto an ink tank holder. Theses three spaces hold respectively an ink absorbing body 44Y for absorbing and retaining a yellow ink, an ink absorbing body 44M for absorbing and retaining a magenta ink, and an ink absorbing body 44C for absorbing and retaining a cyan ink. The inks held in these absorbing bodies 44Y, 44M and 44C, which act as negative-pressure generation members, are present at a level higher than the upper sections of the respective absorbing bodies, as indicated by the liquid surface L of the ink.

In FIG. 2, the reference characters 43Y, 43M and 43C, as well as 45Y, 45M and 45C, denote respectively yellow (Y), magenta (M) and cyan (C) ink supply ports and ink supply members of the three colors of inks. Further, reference characters 46, 47, 47C, 48 and 49 denote respectively a retaining claw, a latch lever, a bottom incline, a latch claw and a bump portion.

<Method for Producing Ink Jet Ink>

There is no specific limitation concerning the method for producing the ink jet ink according to the present invention, as long as the constitutional requirements necessary for the ink according to the present invention are satisfied, i.e. provided that the ink contains, as a coloring material, at least one selected from the group consisting of C.I. Direct Yellow 86, C.I. Acid Yellow 23, C.I. Direct Yellow 173, C.I. Direct Yellow 132 and C.I. Direct Yellow 59, and, a compound represented by the general formula (I) or a salt thereof.

In the present invention, it is particularly preferable that the method has a step of filling an ink tank storing an ink in which a compound represented by the general formula (I) or a salt thereof is contained as a coloring material, with the ink containing, as a coloring material, at least one selected from the group consisting of C.I. Direct Yellow 86, C.I. Acid Yellow 23, C.I. Direct Yellow 173, C.I. Direct Yellow 132 and C.I. Direct Yellow 59. This is because it is possible to reduce costs through the reuse of an ink containing a compound represented by the general formula (I) or a salt thereof, which has excellent durability, and an ink cartridge which stores such ink. In addition to the above advantages, this is also because an ink cartridge which has once stored ink can provide such an accompanying advantage that ink refill is easy.

EXAMPLES

Hereinafter, the present invention will be described in more detail by way of examples and comparative examples. However, the present invention is not limited to the following examples unless the examples depart from the gist of the present invention. Unless otherwise specified, the term "part(s)" of each ink component in examples and comparative examples represents "part(s) by mass", <Synthesis Coloring Material>

Diazotized 4-nitro-4'-aminostilbene-2,2-disulfonic acid and 3-aminonaphthalene-1-sulfonic acid were subjected to coupling. The resultant was turned into a triazole, and a nitro group of the triazole was reduced to an amino group by means of a conventionally known method to produce aminostilbene-triazole. Aminostilbene-triazole was dissolved into water, and sodium nitrite and hydrochloric acid were added dropwise to the solution to perform diazotization. The resultant was added dropwise to an aqueous solution of a compound represented by Compound (1) below, and the whole was subjected to coupling, followed by dialysis with sodium chloride. The compound was diazotized with an aqueous solution of sodium nitrite, and was turned into a triazole by adding an aqueous solution of 6-aminonaphthalene-2-sulfonic acid. The triazole was dialyzed with sodium chloride to prepare a coloring material (sodium salt) represented by the general formula (I).

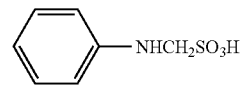

Compound (1)

<Preparation of Ink>

The respective components shown in each of Tables 3 and 4 below were mixed and sufficiently stirred. After that, the resultant was filtered through a filter having a pore size of 0.2 μm under pressure to prepare each of inks of Examples 1 to 15 and Comparative Examples 1 to 10.

TABLE 3

| | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| C.I. Direct Yellow 86 | 3.00 | | | | | 3.00 | | | | | 4.00 | | | | |
| C.I. Acid Yellow 23 | | 3.00 | | | | | 3.00 | | | | | 4.00 | | | |

TABLE 3-continued

| | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| C.I. Direct Yellow 173 | | 3.00 | | | | | 3.00 | | | | | | 4.00 | | |
| C.I. Direct Yellow 132 | | | 3.00 | | | | | 3.00 | | | | | | 4.00 | |
| C.I. Direct Yellow 59 | | | | 3.00 | | | | | 3.00 | | | | | | 4.00 |
| Compound represented by the general formula (I) | 0.04 | 0.04 | 0.04 | 0.04 | 0.04 | 0.05 | 0.05 | 0.05 | 0.05 | 0.05 | 0.10 | 0.10 | 0.10 | 0.10 | 0.10 |
| Glycerin | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Acetylenol EH | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Ion-exchange water | 75.96 | 75.96 | 75.96 | 75.96 | 75.96 | 75.95 | 75.95 | 75.95 | 75.95 | 75.95 | 74.90 | 74.90 | 74.90 | 74.90 | 74.90 |

TABLE 4

| | Comparative Example | | | | | | | | | |
|---|---|---|---|---|---|---|---|---|---|---|
| | 1 | 2 | 3 | 4 | 5 | 6 | 7 | 8 | 9 | 10 |
| C.I. Direct Yellow 86 | 3.00 | | | | | 4.00 | | | | |
| C.I. Acid Yellow 23 | | 3.00 | | | | | 4.00 | | | |
| C.I. Direct Yellow 173 | | | 3.00 | | | | | 4.00 | | |
| C.I. Direct Yellow 132 | | | | 3.00 | | | | | 4.00 | |
| C.I. Direct Yellow 59 | | | | | 3.00 | | | | | 4.00 |
| Compound represented by the general formula (I) | | | | | | | | | | |
| Glycerin | 20.00 | 20.00 | 20.00 | 20.00 | 20.00 | 20.00 | 20.00 | 20.00 | 20.00 | 20.00 |
| Acetylenol EH | 1.00 | 1.00 | 1.00 | 1.00 | 1.00 | 1.00 | 1.00 | 1.00 | 1.00 | 1.00 |
| Ion-exchange water | 76.00 | 76.00 | 76.00 | 76.00 | 76.00 | 75.00 | 75.00 | 75.00 | 75.00 | 75.00 |

<Evaluation of Ink>

The above-obtained inks were each filled into an ink tank having the structure of FIG. 1. These ink tanks were mounted onto an ink jet recording apparatus (trade name: PIXUS 950i, manufactured by Canon Inc.) in which thermal energy was applied to the ink for ejecting ink droplets to conduct recording, where the recording conditions at this time were as follows: temperature of 23° C., humidity of 55%, recording density of 2400 dpi×1200 dpi and ink ejection volume of 2.5 pl, and recording was conducted at a 100% duty on a recording medium (trade name: PR-101, manufactured by Canon Inc.). The obtained recorded matters were subsequently air dried for 24 hours at a temperature of 23° C. and a humidity of 55%.

The color developability of recorded matters obtained using the inks of Examples 1 to 15 was visually evaluated from the viewpoint of comparison with inks containing ion-exchange water in place of the compound represented by the general formula (I) (i.e. Examples 1 and 6 were compared with Comparative Example 1; Examples 2 and 7 with Comparative Example 2; Examples 3 and 8 with Comparative Example 3; Examples 4 and 9 with Comparative Example 4; Examples 5 and 10 with Comparative Example 5; Example 11 with Comparative Example 6; Example 12 with Comparative Example 7; Example 13 with Comparative Example 8; Example 14 with Comparative Example 9; and Example 15 with Comparative Example 10).

Next, the above air-dried recorded matters were allowed to stand at a temperature of 30° C., a humidity of 80% for 168 hours.

The humidity resistance of recorded matters obtained using the inks of Examples 1 to 15 was visually evaluated from the viewpoint of comparison with inks containing ion-exchange water in place of the compound represented by the general formula (I) (i.e. Examples 1 and 6 were compared with Comparative Example 1; Examples 2 and 7 with Comparative Example 2; Examples 3 and 8 with Comparative Example 3; Examples 4 and 9 with Comparative Example 4; Examples 5 and 10 with Comparative Example 5; Example 11 with Comparative Example 6; Example 12 with Comparative Example 7; Example 13 with Comparative Example 8; Example 14 with Comparative Example 9; and Example 15 with Comparative Example 10).

The evaluation criteria for color developability and humidity resistance were as described below. The evaluation results are shown in Table 5.

A: Either color developability or humidity resistance was clearly improved over the Comparative Examples, and, neither color developability nor humidity resistance deteriorated as compared with the Comparative Examples.

B: Either color developability or humidity resistance was improved over the Comparative Examples, and, neither color developability nor humidity resistance deteriorated as compared with the Comparative Examples.

C: Neither color developability nor humidity resistance showed any improvement over the Comparative Examples, or, although one of color developability or humidity resistance was improved over the Comparative Examples, either of color developability or humidity resistance deteriorated as compared with the Comparative Examples.

TABLE 5

| Example | | Evaluation Results |
|---|---|---|
| | 1 | B |
| | 2 | B |
| | 3 | B |
| | 4 | B |
| | 5 | B |
| | 6 | A |
| | 7 | A |
| | 8 | A |
| | 9 | A |
| | 10 | A |
| | 11 | A |
| | 12 | A |
| | 13 | A |
| | 14 | A |
| | 15 | A |

<Preparation of Ink>

The respective components shown in Table 6 below were mixed and sufficiently stirred. After that, the resultant was filtered through a filter having a pore size of 0.2 μm under pressure to prepare and ink.

TABLE 6

| C.I. Direct Yellow 132 | 2.40 |
|---|---|
| Compound represented by the general formula (I) | 0.60 |
| Glycerin | 20.00 |
| Acetylenol EH | 1.00 |
| Ion-exchange water | 78.40 |

Ink tanks having the structure illustrated in FIG. 1 were filled with 14.5 g of an ink prepared according to the formulation shown in Table 6. Then, 12.5 g of the ink was discharged from each of the ink tanks. Subsequently, the above ink tanks were each filled with 10.0 g of the respective inks prepared in Comparative Examples 6 to 10, whereby the inks for Examples 16 to 20 were prepared. The inks of Examples 16 to 20 were extracted from the ink tanks. Analysis of their composition showed that these inks had compositions as shown in Table 7.

TABLE 7

| | Example | | | | |
|---|---|---|---|---|---|
| | 16 | 17 | 18 | 19 | 20 |
| C.I. Direct Yellow 86 | 3.33 | | | | |
| C.I. Acid Yellow 23 | | 3.33 | | | |

TABLE 7-continued

| | Example | | | | |
|---|---|---|---|---|---|
| | 16 | 17 | 18 | 19 | 20 |
| C.I. Direct Yellow 173 | | | 3.33 | | |
| C.I. Direct Yellow 132 | 0.40 | 0.40 | 0.40 | 3.73 | 0.40 |
| C.I. Direct Yellow 59 | | | | | 3.33 |
| Compound represented by the general formula (I) | 0.10 | 0.10 | 0.10 | 0.10 | 0.10 |
| Glycerin | 20.00 | 20.00 | 20.00 | 20.00 | 20.00 |
| Acetylenol EH | 1.00 | 1.00 | 1.00 | 1.00 | 1.00 |
| Ion-exchange water | 75.17 | 75.17 | 75.17 | 75.17 | 75.17 |

<Evaluation of Ink>

The above-obtained inks of Examples 16 to 20 were filled into ink tanks. These ink tanks were mounted onto an ink jet recording apparatus (trade name: PIXUS 950i, manufactured by Canon Inc.) in which thermal energy was applied to the ink for ejecting ink droplets to conduct recording, where the recording conditions at this time were as follows: temperature of 23° C., humidity of 55%, recording density of 2400 dpi×1200 dpi and ink ejection volume of 2.5 pl, and recording was conducted at a 100% duty on a recording medium (trade name: PR-101, manufactured by Canon Inc.). The obtained recorded matters were subsequently air dried for 24 hours at a temperature of 23° C. and a humidity of 55%.

The color developability of the recorded matters obtained using the inks of Examples 16 to 20 were visually evaluated from the viewpoint of comparison with inks containing ion-exchange water in place of the compound represented by the general formula (I) (for the inks of Examples 16, 17, 18, 19 and 20 were compared with the inks of Comparative Examples 11, 12, 13, 14 and 15 which contained ion-exchange water in place of the compound represented by the general formula (I); Example 16 with Comparative Example 11; Example 17 with Comparative Example 12; Example 18 with Comparative Example 13; Example 19 with Comparative Example 14; and Example 20 with Comparative Example 15).

Next, the above air-dried recorded matters were allowed to stand at a temperature of 30° C., a humidity of 80% for 168 hours.

The humidity resistance of the recorded matters obtained using the inks of Examples 16 to 20 was visually evaluated from the viewpoint of comparison with inks containing ion-exchange water in place of the compound represented by the general formula (I) (for the inks of Examples 16, 17, 18, 19 and 20, a comparison with the inks of Comparative Examples 11, 12, 13, 14 and 15 which contained ion-exchange water in place of the compound represented by the general formula (I); Example 16 with Comparative Example 11; Example 17 with Comparative Example 12; Example 18 with Comparative Example 13; Example 19 with Comparative Example 14; and Example 20 with Comparative Example 15).

The evaluation criteria for color developability and humidity resistance are as described below. The evaluation results are shown in Table 8.

A: Either color developability or humidity resistance was clearly improved over the Comparative Examples, and, neither color developability nor humidity resistance deteriorated as compared with the Comparative Examples.

B: Either color developability or humidity resistance was improved over the Comparative Examples, and, neither color developability nor humidity resistance deteriorated as compared with the Comparative Examples.

C: Neither color developability nor humidity resistance showed any improvement over the Comparative Examples, or, although one of color developability or humidity resistance was improved over the Comparative Examples, either of color developability or humidity resistance deteriorated as compared with the Comparative Examples.

TABLE 8

|  |  | Evaluation Results |
|---|---|---|
| Example | 16 | A |
|  | 17 | A |
|  | 18 | A |
|  | 19 | A |
|  | 20 | A |

This application claims priorities from Japanese Patent Application 2004-252203 filed on Aug. 31, 2004, and Japanese Patent Application No. 2005-247601 filed on Aug. 29, 2005, which are hereby incorporated by reference herein.

What is claimed is:

1. An ink cartridge comprising an ink storage portion for storing ink, wherein the ink comprises an ink jet ink obtained by a method for producing an ink jet ink,
wherein the method for producing an ink jet ink comprises a step of filling the ink storage portion which stores an ink jet ink containing, as a coloring material, a compound represented by the following general formula (I) or a salt thereof and C.I. Direct Yellow 132, with an ink jet ink containing, as a coloring material, at least one selected from the group consisting of C.I. Direct Yellow 86, C.I. Acid Yellow 23, C.I. Direct Yellow 173, C.I. Direct Yellow 132, and C.I. Direct Yellow 59

General formula (I)

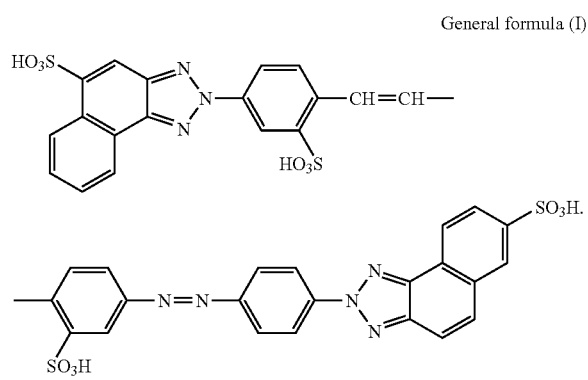

2. An ink jet recording method comprising a step of ejecting an ink by ink jet method to conduct recording on a recording medium, wherein the ink is an ink jet ink stored in the ink cartridge according to claim 1.

3. An ink cartridge comprising an ink storage portion for storing ink jet ink, wherein the ink jet ink contains at least a coloring material,
wherein the coloring material comprises at least one selected from the group consisting of C.I. Direct Yellow 86, C.I. Acid Yellow 23, C.I. Direct Yellow 173, and C.I. Direct Yellow 59, and a compound represented by the following general formula (I) or a salt thereof and C.I. Direct Yellow 132, and
wherein a content of the compound represented by the following general formula (I) or a salt thereof is from 0.05 mass % or more to 0.10 mass % or less with respect to the total mass of the ink jet ink General formula (I)

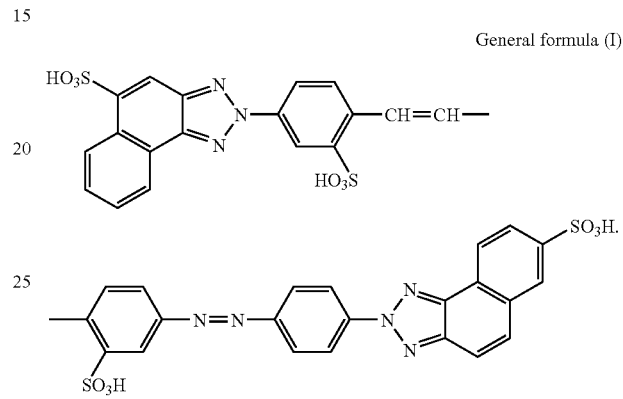

4. An ink jet recording method comprising a step of ejecting an ink by ink jet method to conduct recording on a recording medium, wherein the ink is an ink jet ink stored in the ink cartridge according to claim 3.

5. A method for producing an ink cartridge comprising a step of filling an ink storage portion which stores an ink jet ink containing, as a coloring material, a compound represented by the following general formula (I) or a salt thereof and C.I. Direct Yellow 132, with an ink jet ink containing, as a coloring material, at least one selected from the group consisting of C.I. Direct Yellow 86, C.I. Acid Yellow 23, C.I. Acid Yellow 173, C.I. Direct Yellow 132, and C.I. Direct Yellow 59

General formula (I)

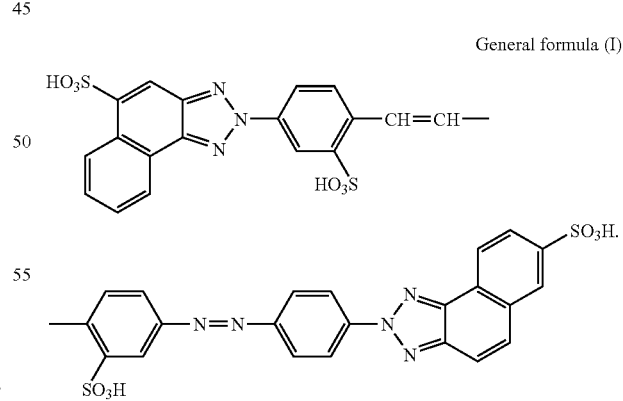

* * * * *

UNITED STATES PATENT AND TRADEMARK OFFICE
CERTIFICATE OF CORRECTION

PATENT NO. : 7,297,199 B2
APPLICATION NO. : 11/362143
DATED : November 20, 2007
INVENTOR(S) : Koichi Osumi et al.

Page 1 of 1

It is certified that error appears in the above-identified patent and that said Letters Patent is hereby corrected as shown below:

COLUMN 4:
Line 49, "consisting" should read --consisting of--.

COLUMN 8:
Line 36, "due" should read --due to--.

COLUMN 12:
Line 23, "," should read --.--.

Signed and Sealed this

Thirtieth Day of December, 2008

JON W. DUDAS
*Director of the United States Patent and Trademark Office*